US012310285B2

(12) United States Patent
Meyers et al.

(10) Patent No.: US 12,310,285 B2
(45) Date of Patent: May 27, 2025

(54) AGRICULTURAL OPERATION EVALUATION SYSTEM AND METHOD

(71) Applicant: Deere & Company, Moline, IL (US)

(72) Inventors: Zachary A. Meyers, Milan, IL (US); Nathan R. Vandike, Geneseo, IL (US); Derek J. Franke, Monroeville, IN (US)

(73) Assignee: DEERE & COMPANY, Moline, IL (US)

( * ) Notice: Subject to any disclaimer, the term of this patent is extended or adjusted under 35 U.S.C. 154(b) by 179 days.

(21) Appl. No.: 18/175,187

(22) Filed: Feb. 27, 2023

(65) Prior Publication Data

US 2024/0284826 A1    Aug. 29, 2024

(51) Int. Cl.
*A01D 41/127* (2006.01)

(52) U.S. Cl.
CPC .................... *A01D 41/127* (2013.01)

(58) Field of Classification Search
CPC ........ A01D 41/127; E02F 9/264; E02F 9/261; E02F 3/32; E02F 9/2221; E02F 9/2285;
(Continued)

(56) References Cited

U.S. PATENT DOCUMENTS 6,119,442 A * 9/2000 Hale .................... A01D 41/127
                                                          56/10.2 H
6,406,368 B1   6/2002 Cruson et al.
(Continued)

FOREIGN PATENT DOCUMENTS

AU    2018203052 A1   11/2019
BR    102021011031 A2  1/2022
(Continued)

OTHER PUBLICATIONS

AQES Webpage: Aerosol Related Research, "Remote Sensing of Dust Plume from Movement of Tracked Vehicles", by Mark J. Rood, Ivan Racheff Professor of Environmental Engineering, retrieved on Nov. 19, 2019; retrieved from the Internet: URL: http://aqes.cee.illinois.edu/research%20areas/lidar/trackedvehicles/trackedvehicles.htm.
(Continued)

*Primary Examiner* — Babar Sarwar
(74) *Attorney, Agent, or Firm* — KLINTWORTH & ROZENBLAT IP LLP

(57) ABSTRACT

An agricultural operation evaluation system for an agricultural work vehicle includes an offboard device configured to collect offboard feedback associated with the agricultural operation and location information; and a controller. The controller is configured to receive the offboard feedback and the location information for the offboard feedback from the offboard device; determine at least one offboard input parameter from the offboard feedback; receive machine data including at least one onboard input parameter and location information for the least one onboard input parameter; correlate the at least one offboard input parameter and the at least one onboard input parameter based on the location information for the at least one offboard input parameter and the location information for the at least one onboard input parameter; and determine one or more vehicle adjustments based on the correlated at least one offboard input parameter and at least one onboard input parameter.

20 Claims, 4 Drawing Sheets

(58) Field of Classification Search
CPC ....... E02F 9/2292; E02F 9/2296; E02F 3/435;
E02F 9/24; E02F 9/267; E02F 3/28; E02F
3/36; E02F 3/3604; E02F 3/40; E02F
3/42; E02F 3/43; E02F 9/00; E02F 9/20;
E02F 9/2025; E02F 9/2058; E02F 9/22;
E02F 9/2203; E02F 9/2264; G06T
7/0008; G06T 7/248; G06T 11/00; G06T
2207/30164; G06T 2207/30252; G06T
2200/24; G06T 2207/10016; G06T 7/001;
G06T 7/246; G06T 11/60; G06V 20/58
See application file for complete search history.

(56) References Cited

U.S. PATENT DOCUMENTS

| | | |
|---|---|---|
| 6,591,145 B1 | 7/2003 | Hoskinson et al. |
| 6,939,221 B1 | 9/2005 | Redekop et al. |
| 7,110,881 B2 | 9/2006 | Gray et al. |
| 7,409,743 B2 | 8/2008 | Di Anna |
| 7,485,035 B1 | 2/2009 | Yde |
| 8,056,313 B2 | 11/2011 | Flora et al. |
| 8,191,346 B2 | 6/2012 | Flora et al. |
| 8,347,595 B1 | 1/2013 | Flora et al. |
| 9,043,129 B2 | 5/2015 | Bonefas et al. |
| 9,795,913 B1 | 10/2017 | Flora et al. |
| 10,126,282 B2 | 11/2018 | Anderson et al. |
| 10,244,675 B2 | 4/2019 | Larowe |
| 11,140,807 B2 | 10/2021 | Pfeiffer et al. |
| 11,240,959 B2 | 2/2022 | Borgstadt |
| 11,246,264 B2 | 2/2022 | Groves |
| 2003/0088321 A1 | 5/2003 | Creger et al. |
| 2003/0190939 A1 | 10/2003 | Bueermann |
| 2003/0199291 A1 | 10/2003 | Bernhardt et al. |
| 2005/0026662 A1 | 2/2005 | Fechner et al. |
| 2005/0059445 A1 | 3/2005 | Niermann et al. |
| 2005/0194473 A1 | 9/2005 | Pearson et al. |
| 2005/0245300 A1 | 11/2005 | Maertens et al. |
| 2006/0183519 A1 | 8/2006 | Benes |
| 2007/0026912 A1 | 2/2007 | Anderson et al. |
| 2007/0111766 A1 | 5/2007 | Holmen |
| 2007/0209423 A1 | 9/2007 | Missotten et al. |
| 2007/0233416 A1 | 10/2007 | Jeppe |
| 2007/0275775 A1 | 11/2007 | Farley et al. |
| 2008/0268927 A1 | 10/2008 | Farley et al. |
| 2008/0318648 A1 | 12/2008 | Baumgarten et al. |
| 2009/0005137 A1 | 1/2009 | Isaac et al. |
| 2009/0036184 A1 | 2/2009 | Craessaerts et al. |
| 2009/0069986 A1* | 3/2009 | Covington ........... A01D 46/085 |
| | | 701/50 |
| 2009/0111548 A1 | 4/2009 | Landuyt |
| 2009/0253474 A1 | 10/2009 | Isaac |
| 2009/0287380 A1 | 11/2009 | Chervenka et al. |
| 2009/0313962 A1 | 12/2009 | Talbi |
| 2009/0325659 A1 | 12/2009 | Overschelde et al. |
| 2011/0045883 A1 | 2/2011 | Weichholdt et al. |
| 2011/0045884 A1 | 2/2011 | Weichholdt et al. |
| 2011/0093169 A1 | 4/2011 | Schroeder et al. |
| 2011/0130180 A1 | 6/2011 | Van Brabant et al. |
| 2011/0130181 A1 | 6/2011 | Roberge et al. |
| 2011/0237316 A1 | 9/2011 | Isaac et al. |
| 2011/0270495 A1 | 11/2011 | Knapp |
| 2011/0295423 A1 | 12/2011 | Anderson |
| 2011/0320087 A1 | 12/2011 | Farley et al. |
| 2012/0178509 A1 | 7/2012 | Eggenhaus et al. |
| 2012/0199649 A1* | 8/2012 | Wishnatzki ........... G06Q 10/08 |
| | | 235/375 |
| 2012/0270613 A1 | 10/2012 | Isaac et al. |
| 2013/0095899 A1 | 4/2013 | Knapp |
| 2013/0324199 A1 | 12/2013 | Roberge et al. |
| 2014/0031096 A1 | 1/2014 | Isaac et al. |
| 2014/0050364 A1* | 2/2014 | Brueckner ............ G06V 20/68 |
| | | 382/110 |
| 2014/0053524 A1 | 2/2014 | Werning |
| 2014/0080555 A1 | 3/2014 | Wagner et al. |
| 2014/0171160 A1 | 6/2014 | Ricketts et al. |
| 2014/0208851 A1 | 7/2014 | Bischoff |
| 2014/0302897 A1 | 10/2014 | Isaac et al. |
| 2015/0009328 A1* | 1/2015 | Escher ................... A01D 75/00 |
| | | 348/148 |
| 2015/0080069 A1 | 3/2015 | Fuchs et al. |
| 2015/0080070 A1 | 3/2015 | Johnson et al. |
| 2015/0264864 A1 | 9/2015 | Branch et al. |
| 2015/0348419 A1 | 12/2015 | Matthews |
| 2015/0351321 A1 | 12/2015 | Shane |
| 2015/0373913 A1 | 12/2015 | Berry et al. |
| 2016/0025531 A1 | 1/2016 | Bischoff et al. |
| 2016/0088794 A1 | 3/2016 | Baumgarten et al. |
| 2016/0113199 A1 | 4/2016 | Jongmans et al. |
| 2016/0189007 A1* | 6/2016 | Wellington .......... G06V 20/695 |
| | | 382/110 |
| 2016/0235003 A1 | 8/2016 | Baumgarten et al. |
| 2016/0286721 A1 | 10/2016 | Heitmann et al. |
| 2016/0286722 A1 | 10/2016 | Heitmann et al. |
| 2016/0327535 A1 | 11/2016 | Cotton et al. |
| 2016/0374267 A1 | 12/2016 | Reinecke et al. |
| 2017/0032473 A1 | 2/2017 | Koch et al. |
| 2017/0034997 A1 | 2/2017 | Mayerle |
| 2017/0071125 A1 | 3/2017 | Pfeiffer et al. |
| 2017/0086372 A1 | 3/2017 | Palla et al. |
| 2017/0086373 A1 | 3/2017 | Mahieu et al. |
| 2017/0094901 A1 | 4/2017 | French et al. |
| 2017/0112055 A1 | 4/2017 | Depreitere et al. |
| 2017/0112061 A1* | 4/2017 | Meyer .................... G06T 11/60 |
| 2017/0115862 A1* | 4/2017 | Stratton ............... A01D 41/127 |
| 2017/0142900 A1 | 5/2017 | Mahieu et al. |
| 2017/0231156 A1 | 8/2017 | Aesaert et al. |
| 2017/0238463 A1 | 8/2017 | Van De Wege et al. |
| 2017/0251601 A1* | 9/2017 | Dugas .................... A01F 12/56 |
| 2017/0273240 A1 | 9/2017 | Quincke |
| 2017/0303465 A1* | 10/2017 | Koch .................... A01B 79/005 |
| 2018/0000011 A1* | 1/2018 | Schleusner ............ G01S 13/87 |
| 2018/0007831 A1 | 1/2018 | Ballegeer et al. |
| 2018/0047177 A1* | 2/2018 | Obropta ................. G06T 17/20 |
| 2018/0049369 A1 | 2/2018 | Secrest et al. |
| 2018/0053067 A1* | 2/2018 | Walker ............... A01D 41/1273 |
| 2018/0084718 A1 | 3/2018 | Baumgarten et al. |
| 2018/0092301 A1 | 4/2018 | Vandike et al. |
| 2018/0092302 A1 | 4/2018 | Vandike et al. |
| 2018/0116112 A1 | 5/2018 | French, Jr. |
| 2018/0310474 A1* | 11/2018 | Posselius ............. A01D 41/127 |
| 2018/0359919 A1 | 12/2018 | Blank et al. |
| 2018/0368318 A1 | 12/2018 | Isaac et al. |
| 2019/0050948 A1 | 2/2019 | Patrick et al. |
| 2019/0059222 A1 | 2/2019 | Kelber |
| 2019/0059232 A1 | 2/2019 | Ricketts |
| 2019/0090421 A1 | 3/2019 | Bollin et al. |
| 2019/0104681 A1 | 4/2019 | Larson et al. |
| 2019/0133037 A1 | 5/2019 | Todd et al. |
| 2019/0141893 A1 | 5/2019 | Vandike et al. |
| 2019/0174674 A1 | 6/2019 | Diessner et al. |
| 2019/0254227 A1* | 8/2019 | Roberge ................. A01D 80/02 |
| 2019/0261560 A1* | 8/2019 | Jelenkovic ......... A01D 41/1274 |
| 2019/0335659 A1 | 11/2019 | Kringe et al. |
| 2020/0015416 A1* | 1/2020 | Barther .................. H04N 7/183 |
| 2020/0029498 A1 | 1/2020 | Vandike et al. |
| 2020/0029499 A1 | 1/2020 | Scherman et al. |
| 2020/0060082 A1 | 2/2020 | Shinners et al. |
| 2020/0084967 A1* | 3/2020 | Corban .................. H04N 23/80 |
| 2020/0100427 A1 | 4/2020 | Beavers et al. |
| 2020/0107502 A1 | 4/2020 | Mayerle et al. |
| 2020/0120869 A1 | 4/2020 | Vandike et al. |
| 2020/0296896 A1 | 9/2020 | Mayerle |
| 2020/0323133 A1 | 10/2020 | Anderson et al. |
| 2020/0375083 A1 | 12/2020 | Anderson et al. |
| 2020/0396904 A1 | 12/2020 | Faulkner et al. |
| 2020/0402184 A1* | 12/2020 | Dasgupta ............. A01D 41/127 |
| 2021/0015039 A1 | 1/2021 | Vandike et al. |
| 2021/0015045 A1 | 1/2021 | Vandike et al. |
| 2021/0034867 A1* | 2/2021 | Ferrari ................. G05D 1/0236 |
| 2021/0127573 A1 | 5/2021 | Mahieu et al. |
| 2021/0144917 A1 | 5/2021 | Gurke et al. |
| 2021/0195839 A1 | 7/2021 | Koch et al. |
| 2021/0264252 A1* | 8/2021 | Davis ..................... G06N 3/08 |

(56) References Cited

U.S. PATENT DOCUMENTS

| | | |
|---|---|---|
| 2021/0272255 A1 | 9/2021 | Barrick et al. |
| 2021/0282329 A1 | 9/2021 | Hall |
| 2021/0321554 A1* | 10/2021 | Liu .................. A01C 21/005 |
| 2021/0368686 A1 | 12/2021 | Wisdom et al. |
| 2021/0400870 A1 | 12/2021 | Sunil et al. |
| 2022/0067906 A1* | 3/2022 | Hadar .................. G06Q 30/018 |
| 2022/0110238 A1 | 4/2022 | Vandike et al. |
| 2022/0110253 A1 | 4/2022 | Anderson et al. |
| 2022/0132742 A1 | 5/2022 | Faulkner et al. |
| 2022/0138987 A1* | 5/2022 | Anderson .................. G06T 7/13 382/110 |
| 2022/0174873 A1 | 6/2022 | Topmöller et al. |
| 2022/0230294 A1* | 7/2022 | Hadar .................. G06T 7/60 |
| 2022/0232768 A1 | 7/2022 | Craig |
| 2022/0309262 A1* | 9/2022 | Herbers .............. G06K 17/0022 |
| 2022/0346313 A1 | 11/2022 | Passchyn et al. |
| 2022/0354054 A1 | 11/2022 | Hermann |
| 2022/0361411 A1 | 11/2022 | Mayerle et al. |
| 2022/0361412 A1 | 11/2022 | Duquesne et al. |
| 2022/0369552 A1 | 11/2022 | Christiansen et al. |
| 2022/0369553 A1 | 11/2022 | Christiansen et al. |
| 2022/0369554 A1 | 11/2022 | Christiansen et al. |
| 2022/0375228 A1 | 11/2022 | Christiansen et al. |
| 2022/0394921 A1 | 12/2022 | Missotten et al. |
| 2022/0394923 A1 | 12/2022 | Christiansen et al. |
| 2022/0394924 A1 | 12/2022 | Christiansen et al. |
| 2022/0394925 A1 | 12/2022 | Missotten et al. |
| 2022/0397417 A1 | 12/2022 | Christiansen et al. |
| 2022/0408642 A1 | 12/2022 | Mygind Bojsen |
| 2023/0026898 A1 | 1/2023 | Baes et al. |
| 2023/0028281 A1 | 1/2023 | Lorriette |
| 2023/0037095 A1 | 2/2023 | Mayerle |
| 2024/0057505 A1* | 2/2024 | Liu .................. A01B 79/005 |

FOREIGN PATENT DOCUMENTS

| | | | |
|---|---|---|---|
| BR | 102021011709 A2 | 12/2022 | |
| CN | 1748451 A | 3/2006 | |
| CN | 2770312 Y | 4/2006 | |
| CN | 101611670 A | 12/2009 | |
| CN | 101743804 A | 6/2010 | |
| CN | 201536492 U | 8/2010 | |
| CN | 201657632 U | 12/2010 | |
| CN | 102090207 A | 6/2011 | |
| CN | 102138383 A | 8/2011 | |
| CN | 102396322 A | 4/2012 | |
| CN | 102812825 A | 12/2012 | |
| CN | 103141214 A | 6/2013 | |
| CN | 103196777 A | 7/2013 | |
| CN | 103404299 A | 11/2013 | |
| CN | 203661659 U | 6/2014 | |
| CN | 204202641 U | 3/2015 | |
| CN | 204305637 U | 5/2015 | |
| CN | 204518489 U | 8/2015 | |
| CN | 106706177 A | 5/2017 | |
| CN | 107123115 A | 9/2017 | |
| CN | 108093830 A | 6/2018 | |
| CN | 108107049 A | 6/2018 | |
| CN | 108370712 A | 8/2018 | |
| CN | 108593155 A | 9/2018 | |
| CN | 208159295 U | 11/2018 | |
| CN | 108934416 A | 12/2018 | |
| CN | 109041759 A | 12/2018 | |
| CN | 208191337 U | 12/2018 | |
| CN | 109548472 A | 4/2019 | |
| CN | 109566064 A | 4/2019 | |
| CN | 110381727 A * | 10/2019 | ........... A01F 15/042 |
| CN | 110583217 A | 12/2019 | |
| CN | 110622684 A | 12/2019 | |
| CN | 209861615 U | 12/2019 | |
| CN | 112577766 A | 3/2021 | |
| DE | 20104694 U1 | 5/2001 | |
| DE | 10062114 A1 | 9/2002 | |
| DE | 102014005904 A1 | 10/2015 | |
| DE | 102014014049 A1 | 3/2016 | |
| DE | 102015224175 B3 | 4/2017 | |
| DE | 102020118160 A1 | 1/2021 | |
| EP | 0264764 A2 | 4/1988 | |
| EP | 0586999 A2 | 3/1994 | |
| EP | 0685151 B1 | 12/1995 | |
| EP | 1266553 B1 | 12/2002 | |
| EP | 1736044 B1 | 9/2008 | |
| EP | 1964465 B1 | 9/2008 | |
| EP | 1790207 B1 | 11/2009 | |
| EP | 1856966 B1 | 11/2009 | |
| EP | 2364587 B1 | 9/2011 | |
| EP | 1900272 B1 | 12/2011 | |
| EP | 2561746 B1 | 12/2014 | |
| EP | 2936962 B1 | 8/2017 | |
| EP | 3205201 A1 | 8/2017 | |
| EP | 2936961 B1 | 8/2018 | |
| EP | 3205201 B1 | 8/2018 | |
| EP | 3172959 B1 | 9/2018 | |
| EP | 3228174 B1 | 3/2019 | |
| EP | 3000302 B1 | 8/2019 | |
| EP | 3613272 A1 | 2/2020 | |
| EP | 3845050 A1 | 7/2021 | |
| EP | 3879363 A1 * | 9/2021 | ......... G05B 19/0423 |
| EP | 4000373 A1 | 5/2022 | |
| EP | 4091422 A1 | 11/2022 | |
| EP | 4091423 A1 | 11/2022 | |
| EP | 4091424 A1 | 11/2022 | |
| EP | 4094564 A1 | 11/2022 | |
| EP | 4101282 A1 | 12/2022 | |
| EP | 4101283 A1 | 12/2022 | |
| EP | 4104665 A1 | 12/2022 | |
| EP | 4115723 A1 | 1/2023 | |
| EP | 4129044 A1 | 2/2023 | |
| GB | 2182284 A | 5/1987 | |
| GB | 2387098 A | 10/2003 | |
| GB | 202108227 | 7/2021 | |
| GB | 2606740 A | 11/2022 | |
| GB | 2606741 A | 11/2022 | |
| IN | 202011006479 A | 8/2021 | |
| JP | UP2005102610 A | 4/2005 | |
| JP | 2012200171 A | 10/2012 | |
| JP | 2012244942 A | 12/2012 | |
| JP | 2014117242 A | 6/2014 | |
| JP | 2015023807 A | 2/2015 | |
| JP | 2015097487 A | 5/2015 | |
| JP | 2017176061 A | 10/2017 | |
| PL | 397262 A1 | 6/2013 | |
| PL | 219431 B1 | 4/2015 | |
| RU | 76771 U1 | 10/2008 | |
| RU | 2453101 C1 | 6/2012 | |
| RU | 171483 U1 | 6/2017 | |
| RU | 2677189 C2 | 1/2019 | |
| RU | 187590 U1 | 3/2019 | |
| RU | 188022 U1 | 3/2019 | |
| WO | WO2003005803 A1 | 1/2003 | |
| WO | WO2003039238 A1 | 5/2003 | |
| WO | WO08126013 A2 | 10/2008 | |
| WO | WO14030511 A1 | 2/2014 | |
| WO | WO2017075002 A1 | 5/2017 | |
| WO | WO17170633 A1 | 10/2017 | |
| WO | WO2018076428 A1 | 5/2018 | |
| WO | WO2018162699 A1 | 9/2018 | |
| WO | WO19067906 A2 | 4/2019 | |
| WO | WO19210388 A1 | 11/2019 | |
| WO | WO2022243785 A1 | 11/2022 | |
| WO | WO-2022243786 A1 * | 11/2022 | ......... A01D 41/1243 |
| WO | WO-2023043781 A1 * | 3/2023 | ........... A01D 46/085 |
| WO | WO-2023187494 A1 * | 10/2023 | |

OTHER PUBLICATIONS

Alvarado, Miguel et al., "Towards The Development of a Low Cost Airborne Sensing System to Monitor Dust Particles after Blasting at Open-Pit Mine Sites". Sensors (Basel). Aug. 2015; 15(8): 19667-19687. Accessed Jan. 31, 2018 5:30 PM CST from https://www.ncbi.nlm.nih.gov/pmc/articles/PMC4570391/.

(56) References Cited

OTHER PUBLICATIONS

Kovar, Margaret, "Dust Emission Research May Lead to Reduction of Air Pollutants". New Mexico State University, Mar. 16, 2009, Accessed Jan. 31, 2018 from http://newscenter.nmsu.edu/Articles/view/4441.

Meyer, Thomas H., "A Dynamic Lagrangian, Field-scale Model of Dust Dispersion from Agricultural Tilling Operations", Jan. 1, 2008, Accessed Jan. 31, 2018 4:45 PM CST from http://opencommons.uconn.edu/cgi/viewcontent.cgi?article=1009&context=nrme_articles.

"Grain Handling Operations and Dust Control" accesed Feb. 9, 2018 3:45 PM from https://www.illinois.gov/dceo/SmallBizAssistance/EnvironmentalAssistanceProgram/Documents/grain%20handling%20operations%20dust%20control.pdf.

Video focusing on Minimizing Almond Harvest Dust accessed Feb. 9, 2018 3:50 PM from http://www.growingproduce.com/nuts/videos-focus-on-minimizing-almond-harvest-dust/.

Video of Exact Almond Harvester with Patented Eco-Clean System to Minimize Dust (reduction up to 75%) at harvest accessed Feb. 9, 2018 at 4:00 PM https://www.youtube.com/watch?time_continue=105&v=-pLu0TPEC9k.

Video of New Technology & Incentives to Reduce Dust at Harvest, CaliforniaAgNet, https://www.youtube.com/watch?v=9PoPUoTQEKQ, 2016.

Thelen, Marilyn, "Only You Can Prevent Combine Fires MSU Extension", Oct. 7, 2016; http://msue.anr.msu.edu/news/only_you_can_prevent_combine_fires.

Williams, Jack, "Many Midwest Farmers Wary Of Changes To NAFTA", Published on Apr. 3, 2017 at 11.56 am CDT; http://harvestpublicmedia.org/post/watch-many-midwest-farmers-wary-changes- nafta.

The Farmers Wife: Wheat Harvest, Tuesday Jul. 26, 2011; http://thefarmersbetterhalf.blogspot.com/2011/07/wheat-harvest.html?_sm_au_=iVV27JvvnH2B27ST.

Wallpaper HD of sunlight, sky, field, clouds, yellow, flying, farm, dust, grain, machine, dusk, Working, wheat, etc., taken with an unknown camera Oct. 31, 2017; https://wallhere.com/en/wallpaper/881188.

Harvest . . . Hot Rods . . . Horses . . . One Hot Time In Juniper Canyon, by Hot Rod Cowgirl dated Aug. 12, 2011; https://hotrodcowgirl.com/2011/08/12/hot-time-summer-in-the-city-juniper-canyon-2011/.

Custom Harvest Insurance, Ltd., Brochure, 601 S. 5th St., Ste. B Manhattan, KS 66502; http://www.charvest.com/, Copyright 2023.

Dust Control—Santa Barbara County Air Pollution Control District; https://www.ourair.org/dust-control/, Copyright 2023.

Common, Casey, "Snow Emergencies Declared in Minneapolis, St. Paul", Jan. 18, 2014—4:55PM; http://www.startribune.com/snow-emergencies-declared-in-minneapolis-st-paul/241006981/.

Ono, Duane, "Wind Blown Dust Monitoring and Modeling at Owens Lake, CA", Jul. 2004, WRAP Dust Emissions Joint Forum Meeting, Reno, Nevada; https://slideplayer.com/slide/6388678/.

Barnes, David L., "Managing Dust on Unpaved Roads and Airports", Oct. 2014; https://www.researchgate.net/publication/267866793_Managing_Dust_on_Unpaved_Roads_and_Airports?_sg=TSMI6swtvie8iNP6Mm3YLLmuJ2TP9EEfO3nyQT5KM31_1VdkQWKJoeyif5Lh8iXf1hjHrle_sA.

Kok J F, Parteli E J R, Michaels T I and Bou Karam D 2012 The Physics of Windblown Sand and Dust, Rep. Prog. Phys. 75 106901. Accessed Feb. 9, 2018 2:20 PM CST from https://arxiv.org/ftp/arxiv/papers/1201/1201.4353.pdf.

Dust Diverter | Combine Accessories Made In USA | WA Johnson Inc.; W.A. Johnson Dust Diverter John Deere S Series Combine, [Internet Archive Wayback Machine first available date, Jan. 17, 2022, from: https://www.wajohnson.com/-dust-diverter.html.].

Dust Diverters—Copyright © 2023 GVL Polymers, Inc.,; https://gvlpoly.com/agri-poly/dust-diverters/.

Welcome to Agtalk; Anyone Using the Add on Dust Control Devices for Headers?—Sep. 19 2007, https://talk.newagtalk.com/forums/thread-view.asp?tid=30144&DisplayType=nested&setCookie=1.

Exact, An Exciting New Standard in Low Dust Nut Harvesting-Exact Harvesting system; http://exactcorp.com/products/harvesters/, © 2015 Exact Corporation.

New Innovations to Reduce Dust in Almond Orchards, by Dennis Pollock, Contributing Writer | Nov. 17, 2016; http://www.westernfarmpress.com/tree-nuts/new-innovations-reduce-dust-almond-orchards.

Large Scale Industrial Odour & Dust Suppression, MistCannon, pp. 6. [online]: retrieved on Nov. 19, 2019; retrieved from the Internet: URL: https://www.environmental-expert.com/products/mistcannon-outdoor-dust-suppression-equipment-440299.

North Dakota Geological Survey by Lynn D. Helms: retrieved on May 5, 2022; retrieved from the internet: https://www.dmr.nd.gov/ndgs/.

Impacts of Biofilms on the Conversion of Cellulose, by Simone Brethauer, Published online: Apr. 26, 2020; (PDF) (researchgate.net).

IJMS | Free Full-Text | Impact of Cell Wall Composition on Maize Resistance to Pests and Diseases | HTML (mdpi.com), by by Rogelio Santiago.

Structure of Lignocellulosic Biomass and Its Biopolymers; Cellulose, . . . | Download Scientific Diagram (researchgate.net) Published Mar. 20, 2021.

Chemical and Structural Characterization of Maize Stover Fractions in Aspect of Its Possible Applications—PMC (nih.gov), 2021.

"Composting and Formation of Humic Substances" by R B Harrison in Encyclopedia of Ecology, 2008. Lignin Decomposition—an overview | ScienceDirect Topics.

Cellulose Decomposition; Microbial Decomposition of Cellulose in Soil—Online Biology Notes, 2023.

"Processes of Crop Residue Breakdown", Kruger Seeds. Aug. 15, 2018. Accessed Jun. 8, 2022 10:00 AM from Processes of Crop Residue Breakdown (krugerseed.com).

"Corn Residue Breakdown as Affected by Tillage and N Application", Iowa State University Extension. Nov. 5, 2019. Accessed Jun. 8, 2022 9:30 AM CDT from Corn Residue Breakdown as Affected by Tillage and N Application | Integrated Crop Management (iastate.edu).

NMR Characterization of Lignans—PMC (nih.gov) Types and Subtypes of Lignans from "NMR Characterization of Lignans" by Roberto Consonni and Gianluca Ottoline, Molecules, Apr. 2022, 27(7).

[Terahertz and Infrared Spectroscopic Investigation of Cellulose]—PubMed (nih.gov) "Terahertz and Infrared Spectroscopic Investigation of Cellulose" [English abstract, article is in Chinese] by Guo-hau Qiu, Le Zhang, and Nan-ying Shentu. Mar. 2016.

"Terahertz Spectroscopy and Imaging: A review on Agricultural Applications" by Leili Afsah-Hejri et al. Computers and Electronics in Agriculture vol. 177, Oct. 2020, 105628. https://www.sciencedirect.com/science/article/abs/pii/S0168169919318204.

Corn Residue Field Days Oct. 20, 28 | Institute of Agriculture and Natural Resources—CropWatch | University of Nebraska-Lincoln (unl.edu), Peta-Gaye Clachar—Communications Specialist, Oct. 4, 2016.

Chemical and Structural Characterization of Maize Stover Fractions in Aspect of Its Possible Applications—PMC (nih.gov), Cédric Delattre, Academic Editor, https://www.ncbi.nlm.nih.gov/pmc/articles/PMC8004008/ Mar. 2021.

Dry or Senescent Carbon (l3harrisgeospatial.com), © 2023 NV5 Geospatial | Legal, https://www.l3harrisgeospatial.com/docs/DrySenescentCarbon.html#:~:text=The dry or senescent carbon, cell walls in plant tissues.

KData Management | John Deere HarvestLab™ 3000 and Constituent Sensing | John Deere US Jun. 13, 2022 9:00 AM CDT).

"Using NDF and ADF to Balance Diets", Belyea et al., University of Missouri Extension. Using NDF and ADF to Balance Diets | MU Extension (missouri.edu), Department of Animal Sciences, © 1993 to 2023.

(56) References Cited

OTHER PUBLICATIONS

"Determination of Cellulose, NDF, ADF, and Lignan Content Using Non-Destructive Method (FT-NIR Spectrometry) in Hay from Apuseni Mountains", Laura Dale et al. (Abstract only) (PDF) Determination of Cellulose, NDF, ADF and Lignin Content Using Non-Destructive Method (FT-NIR Spectrometry) in Hay from Apuseni Mountains (researchgate.net). Oct. 2011.
ScienceDirect, "Crop-Residue Management", D.C. Reicosky et al., Encyclopedia of Soils in the Environment, 2005, https://www.sciencedirect.com/topics/earth-and-planetary-sciences/cropresidue.
European Search Report issued in counterpart European Application No. 20184744.9 dated Dec. 15, 2020 (08 pages).

\* cited by examiner

AGRICULTURAL OPERATION EVALUATION SYSTEM AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to agricultural operation evaluation systems and methods for harvesters and other types of agricultural work vehicles.

BACKGROUND OF THE DISCLOSURE

There are a wide variety of different types of agricultural machines, forestry machines, and/or construction machines. As examples, some agricultural machines include harvesters, such as combine harvesters, sugar cane harvesters, cotton harvesters, self-propelled forage harvesters, and windrowers. Harvest operations may involve various types of systems and management mechanisms in order to improve overall performance and production.

SUMMARY OF THE DISCLOSURE

The disclosure provides agricultural operation evaluation systems and methods.

In one aspect, an agricultural operation evaluation system for an agricultural work vehicle is provided. The system includes an offboard device configured to collect offboard feedback associated with the agricultural operation and location information for the offboard feedback; and a controller having a processor and memory architecture configured to: receive the offboard feedback and the location information for the offboard feedback from the offboard device; determine at least one offboard input parameter from the offboard feedback; receive machine data including at least one onboard input parameter and location information for the least one onboard input parameter; correlate the at least one offboard input parameter and the at least one onboard input parameter based on the location information for the at least one offboard input parameter and the location information for the at least one onboard input parameter; and determine one or more agricultural work vehicle adjustments based on the correlated at least one offboard input parameter and at least one onboard input parameter.

In the agricultural operation evaluation system, the at least one offboard input parameter may be an offboard qualitative input parameter.

In the agricultural operation evaluation system, the at least one offboard input parameter may be an offboard quantitative input parameter.

In the agricultural operation evaluation system, the at least one onboard input parameter may be an onboard qualitative input parameter.

In the agricultural operation evaluation system, the at least one onboard input parameter may be an onboard quantitative input parameter.

In the agricultural operation evaluation system, the at least one offboard input parameter may be an offboard qualitative input parameter and the at least one onboard input parameter is an onboard qualitative input parameter.

In the agricultural operation evaluation system, the at least one offboard input parameter may be an offboard quantitative input parameter and the at least one onboard input parameter is an onboard qualitative input parameter.

In the agricultural operation evaluation system, the at least one offboard input parameter may be an offboard qualitative input parameter and the at least one onboard input parameter is an onboard quantitative input parameter.

In the agricultural operation evaluation system, the at least one offboard input parameter may be an offboard quantitative input parameter and the at least one onboard input parameter is an onboard quantitative input parameter.

In the agricultural operation evaluation system, the offboard device may configured to collect the offboard feedback as an image and the controller is configured to extract the at least one offboard input parameter from the image.

In the agricultural operation evaluation system, the controller may be configured to extract the at least one offboard input parameter from the image as an offboard quantitative input parameter.

In the agricultural operation evaluation system, the controller is configured to extract the at least one offboard input parameter from the image as an offboard qualitative input parameter.

In a further aspect, a method is provided. for evaluating an agricultural operation of an agricultural work vehicle. The method may include collecting, with an offboard device, offboard feedback associated with the agricultural operation and location information for the offboard feedback; receiving, with a controller, the offboard feedback and the location information for the offboard feedback from the offboard device; determining, with a controller, at least one offboard input parameter from the offboard feedback; receiving, with a controller, machine data including at least one onboard input parameter and location information for the least one onboard input parameter; correlating, with a controller, the at least one offboard input parameter and the at least one onboard input parameter based on the location information for the at least one offboard input parameter and the location information for the at least one onboard input parameter; and determining, with a controller, one or more agricultural work vehicle adjustments based on the correlated at least one offboard input parameter and at least one onboard input parameter.

In the method, the at least one offboard input parameter may be an offboard qualitative input parameter.

In the method, the at least one offboard input parameter may be an offboard quantitative input parameter.

In the method, the at least one offboard input parameter may be an offboard qualitative input parameter and the at least one onboard input parameter is an onboard qualitative input parameter.

In the method, the at least one offboard input parameter may be an offboard quantitative input parameter and the at least one onboard input parameter is an onboard qualitative input parameter.

In the method, the at least one offboard input parameter may be an offboard qualitative input parameter and the at least one onboard input parameter is an onboard quantitative input parameter.

In the method, the at least one offboard input parameter may be an offboard quantitative input parameter and the at least one onboard input parameter is an onboard quantitative input parameter.

In the method, the collecting the offboard feedback may include collecting the offboard feedback as an image, and the step of determining the at least one offboard input parameter from the offboard feedback may include includes extracting the at least one offboard input parameter from the image.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
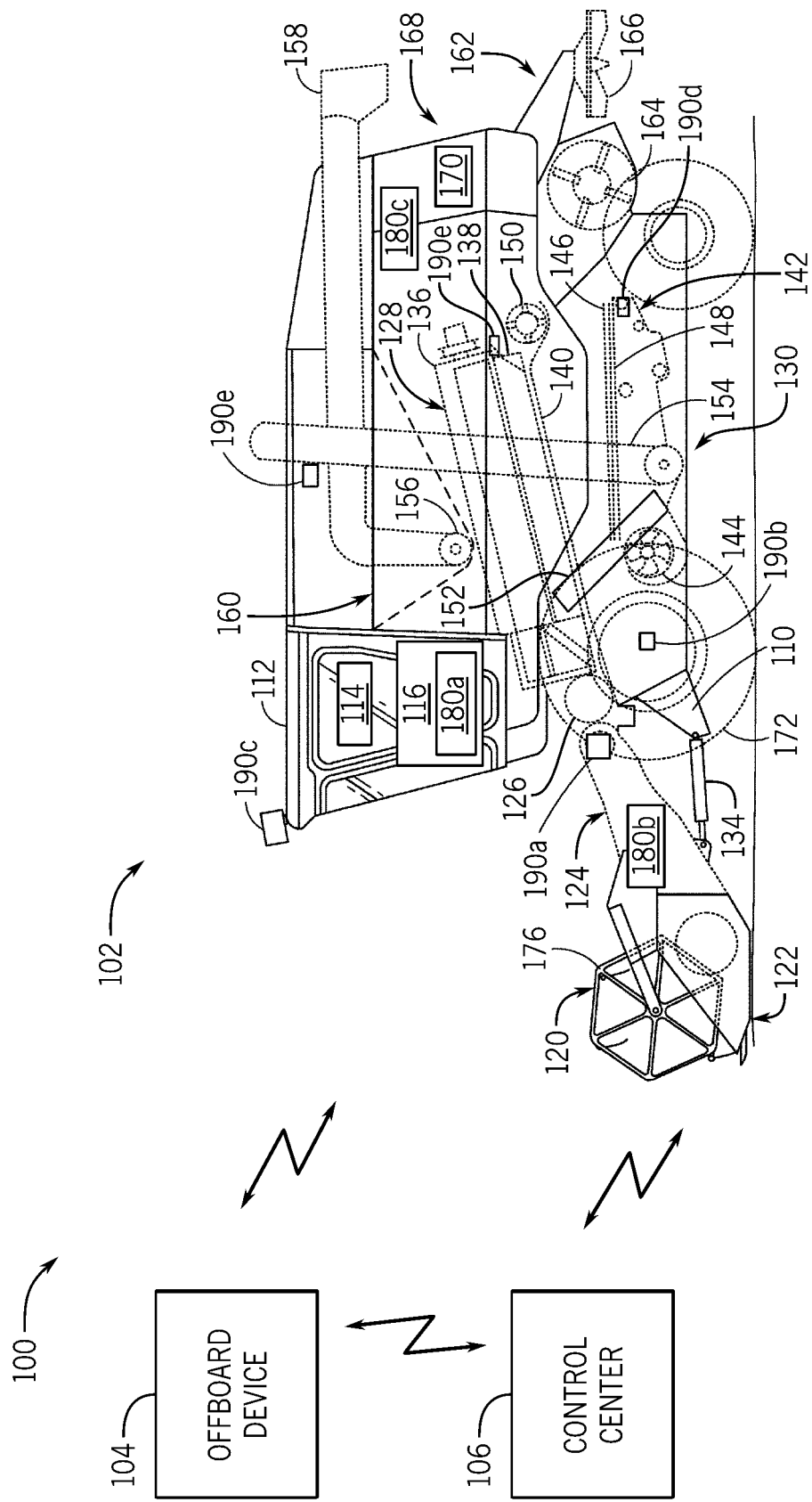
FIG. 1 is a partial pictorial, partial schematic representation of an agricultural evaluation system that may be implemented with an agricultural harvester in accordance with an example embodiment.

The following describes one or more example embodiments of the disclosed agricultural operation evaluation system and method, as shown in the accompanying figures of the drawings described briefly above. Various modifications to the example embodiments may be contemplated by one of skill in the art. Discussion herein may sometimes focus on the example application in an agricultural harvester, but the disclosed system and method are applicable to other types of work vehicles and/or other types of work environments.

As noted, there are a wide variety of different types of agricultural machines, forestry machines, and/or construction machines. As examples, some agricultural machines include harvesters, such as combine harvesters, sugar cane harvesters, cotton harvesters, self-propelled forage harvesters, and windrowers. Additional types of agricultural work vehicles may include planters and sprayers. Agricultural operations may involve various types of systems and management mechanisms in order to improve overall performance and production.

Operation of the agricultural work vehicle and/or overall harvest and other types of agricultural operation management may be challenging, given the high number of factors may impact such operation. Automation is a benefit, but many of the factors are difficult to capture and/or address in an automated system. Reliance upon the judgement of an operator is still useful and conventional systems may not be able to adequately incorporate operator feedback.

According to examples discussed herein, an agricultural operation evaluation system and method may incorporate qualitative and quantitative operator or offboard feedback. Such feedback may be correlated with machine or onboard data based on location, which enables machine and agricultural insights to be drawn. In response, the system and method may generate "adjustments" for the agricultural vehicle, which may include modifying operator settings, machine calibration, and/or displays.

With respect to the system and method, the offboard feedback and the onboard machine data may be evaluated as input parameters representing characteristics of the vehicle or the agricultural operation. In addition to "offboard" or "onboard," referencing the source of the input parameters, the input parameters may be considered "quantitative" or "qualitative" based on the nature of the input parameter and/or feedback. The term "qualitative input parameter" (or metric) may refer to a parameter that is, at least in part, based on the judgement of the operator. Such parameters may be expressed as categories, such as "acceptable," "good," "bad," "long," "short," "high," "low," "moderate," and the like as ranges or qualifications to express such judgement. During processing, the qualitative input parameter may be at least partially quantified into a metric to enable further evaluation with other parameters. The term "quantitative input parameter" (or metric) may refer to an exact or estimated numerical value representing one or more physical characteristics. Generally, qualitative input parameters rely at least partially on the subjective judgement of the operator, while quantitative input parameters are more objective and/or absolute.

As used herein, the term "operator" may refer to many individuals and/or groups involved in an agricultural operation. Generally, the operator may be operators within the work vehicles, operators outside of the work vehicle at the work site, operators at the control center, remote or portal operators, service technician operators, etc. At times, the operator may be considered the person collecting feedback outside or offboard of the vehicle, e.g., via an offboard device or other mechanism instead of equipment forming part of the vehicle. The term "offboard" is used herein, particularly in reference to an offboard device. Generally, such offboard devices are discussed in greater detail below. However, the offboard devices typically refer to personal or more general devices associated with an operator that may communicate and/or interact with the work vehicle but that otherwise is separate from the work vehicle (even if being held by the operator within or on the work vehicle).

Accordingly, in the discussion below, feedback originating from an offboard device may be considered with respect to an "offboard input parameter" and information originating from the work vehicle may be considered with respect to an "onboard input parameter." As such, when additionally categorized with qualitative and quantitative characteristics discussed above, the systems and methods discussed herein may consider combinations or two or more offboard qualitative input parameters, onboard qualitative input parameters, offboard quantitative input parameters, and/or onboard quantitative input parameters.

Reference is made to FIG. 1, which is a partial pictorial, partial schematic, illustration of an agricultural operation evaluation system 100 that may be implemented with a self-propelled agricultural harvester 102, one or more offboard devices 104, and a control center 106 associated with a work site (e.g., a field or harvest location, in the depicted example). In some examples, the control center 106 may be omitted.

The elements within the work site may wirelessly communicate with one another in any suitable manner, including directly (e.g., via Bluetooth®, radio frequency signals, or the like) or over network via communications interfaces discussed in greater detail below. Thus, the communication components discussed below may include a Bluetooth® transceiver, a radio transceiver, a cellular transceiver, an LTE transceiver, and/or a Wi-Fi transceiver. For example, such communications may utilize one or more of various communication techniques or mechanisms, including radio frequency, Wi-Fi, cellular, telematics, and/or any other suitable platforms.

In the illustrated example, the harvester 102 is a combine harvester. Although combine harvesters are provided as examples throughout the present disclosure, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters described and is, thus, not limited to combine harvesters. Moreover, the present disclosure is directed to other types of work machines, such as agricultural seeders and sprayers, construction equipment, forestry equipment, and turf management equipment where generation of a predictive map may be applicable. Consequently, the present disclosure is intended to encompass these various types of harvesters and other work machines and is, thus, not limited to combine harvesters. Additional details about the harvester 102 will be discussed below after a brief introduction of the offboard device 104 and the control center 106.

Briefly, the harvester 102 may interact with an offboard device 104 and a control center 106. Generally, the offboard device 104 functions as a personal or general device that enables an operator to provide qualitative and/or quantitative feedback separate from the harvester 102; and the control center 106 may operate as a "backend" system or server that facilities harvesting and/or harvest monitoring operations. Although not depicted, the control center 106 may also include or interact with one or more unmanned aerial devices that may be manually piloted, autonomously piloted, or semi-autonomously piloted over a harvest site. Such aerial devices may function to collect location information and images of the harvest site as feedback and/or context information for use by the harvest operation evaluation system 100.

Prior to describing how the harvester 102 implements aspects of the harvest operation evaluation system 100, a brief description of some of the items on the harvester 102 with be provided.

As shown in FIG. 1, the harvester 102 illustratively includes a frame 110 that supports the various components and elements discussed herein, including an operator compartment 112, which may have a variety of different operator interface mechanisms, for controlling the harvester 102. In some examples, the harvester 102 may include one or more machine display interfaces (or other types of human-machine interfaces) 114 arranged within the operator compartment 112.

Generally, the display interface 114 enables an operator to interface with the various aspects of the harvest operation evaluation system 100 (e.g., one or more of other systems and components of the harvester 102, the offboard device 104, and/or the control center 106). In one example, the display interface 114 includes at least an input device and a display, either as separate devices or combined. The input device of the display interface 114 is any device capable of receiving user input, including, but not limited to, a keyboard, a microphone, a touchscreen layer associated with the display, or other device to receive data and/or commands from the user. The display of the display interface 114 may include any technology for displaying information, including, but not limited to, a liquid crystal display (LCD), light emitting diode (LED), organic light emitting diode (OLED), plasma, or a cathode ray tube (CRT). In some embodiments, the display interface 114 may include output devices in addition to the display, including speakers and haptic actuators.

In one example, the agricultural operation evaluation system 100 and/or harvester 102 may include a controller 116 that implements the various functions discussed herein. The controller 116 may be considered a vehicle controller and/or a dedicated system controller or sub-controller and/or distributed at least partially offboard the harvester 102 (e.g., including at least partially at the control center 106 and/or the offboard device 104). In one example, the controller 116 may be implemented with processing architecture such as a processor and memory. For example, the processor may implement the functions described herein based on programs, instructions, and data stored in memory.

As such, the controller 116 may be configured as one or more computing devices with associated processor devices and memory architectures, as a hard-wired computing circuit (or circuits), as a programmable circuit, as a hydraulic, electrical or electro-hydraulic controller, or otherwise. The controller 116 may be configured to execute various computational and control functionality with respect to the harvester 102 (or other machinery). In some embodiments, the controller 116 may be configured to receive input signals in various formats (e.g., as hydraulic signals, voltage signals, current signals, and so on), and to output command signals in various formats (e.g., as hydraulic signals, voltage signals, current signals, mechanical movements, and so on). For example, the controller 116 may be in electronic or hydraulic communication with various actuators, sensors, and other devices within (or outside of) the harvester 102, including any devices described below. Although not shown or described in detail herein, the harvester 102 may include any number of additional or alternative systems, subsystems, and elements. Operation of the controller 116 within the context of the agricultural operation evaluation system 100 is discussed in greater detail below.

The harvester 102 includes front-end equipment, such as a header 120, and a cutter generally indicated at 122. The harvester 102 also includes a feeder house 124, a feed accelerator 126, and a thresher 128. The feeder house 124 and the feed accelerator 126 form part of a material handling subsystem 130. Header 120 is pivotally coupled to a frame 110 of the harvester 102 along pivot axis. One or more actuators 134 drive movement of header 120 about axis. Additionally, a vertical position of header 120 (the header height) above ground over which the header 120 travels is controllable by actuating actuator 134. While not shown in FIG. 1, the harvester 102 may also include one or more actuators that operate to apply a tilt angle, a roll angle, or both to the header 120 or portions of header 120.

The thresher 128 includes a threshing rotor 136 and a set of concaves 138. Further, the harvester 102 also includes a separator 140. The harvester 102 also includes a cleaning subsystem or cleaning shoe (collectively referred to as cleaning subsystem) 142 that includes a cleaning fan 144, chaffer 146, and sieve 148. The material handling subsystem 130 also includes discharge beater 150, tailings elevator 152, clean grain elevator 154, unloading auger 156, and spout 158. The clean grain elevator 154 moves clean grain into clean grain tank 160. The harvester 102 also includes a residue subsystem 162 that may include a chopper 164 and a spreader 166. The harvester 102 also includes a propulsion subsystem 168 with an engine 170 that drives ground engaging components 172, such as wheels or tracks.

In operation and by way of overview, as the harvester 102 moves through a field, header 120 (and an associated reel 176) engages the crop to be harvested and gathers the crop toward cutter 122 with actuator commands for height, tilt angle, and roll angle. Actuator commands may be monitored and adjusted to achieve the most appropriate settings.

After crops are cut by cutter 122, the severed crop material is moved through a conveyor in feeder house 124 toward feed accelerator 126, which accelerates the crop material into thresher 128. The crop material is threshed by threshing rotor 136 rotating the crop against concaves 138. The threshed crop material is moved by a separator rotor in separator 140 where a portion of the residue is moved by discharge beater 150 toward the residue subsystem 162. The portion of residue transferred to the residue subsystem 162 is chopped by residue chopper 164 and spread on the field by spreader 166. In other configurations, the residue is released from the harvester 102 in a windrow. In other examples, the residue subsystem 162 can include weed seed eliminators (not shown) such as seed baggers or other seed collectors, or seed crushers or other seed destroyers.

The grain falls to cleaning subsystem 142. The chaffer 146 separates some larger pieces of material from the grain, and sieve 148 separates some of finer pieces of material from the clean grain. Clean grain falls to an auger that moves the grain to an inlet end of clean grain elevator 154, and the clean grain elevator 154 moves the clean grain upwards, depositing the clean grain in clean grain tank 160. Residue is removed from the cleaning subsystem 142 by airflow generated by cleaning fan 144. Cleaning fan 144 directs air along an airflow path upwardly through the sieves 148 and chaffers 146. The airflow carries residue rearwardly in the harvester 102 toward the residue subsystem 162.

The tailings elevator 152 returns tailings to thresher 128 where the tailings are re-threshed. Alternatively, the tailings also may be passed to a separate re-threshing mechanism by a further elevator or transport device in which the tailings may be re-threshed as well.

One or more various subsystems 142, 162, 168 may include, or otherwise be associated with, one or more monitoring and/or actuation subsystems 180a-180c that facilitate operation (e.g., maneuvering, propulsion, etc.) of the harvester 102 and/or the harvesting functions carried out by the harvester 102. Generally, monitoring and/or actuation subsystems 180a-180c may be implemented by the controller 116, one or more sensors (e.g., sensors 190a-190e), and/or one or more actuators, aspects of which are discussed below. In one example, the monitoring and/or actuation subsystems 180a-180c may include a machine automation subsystem 180a, a header loss subsystem 180b, and a grain loss subsystem 180c.

Generally, in one example, the machine automation subsystem 180a may be implemented by the controller 116 in order to generate autonomous or semi-autonomous commands to various actuators and other systems or subsystems of the harvester 102 for propulsion, maneuvering, and overall operation of the harvester 102. In one example, the header loss subsystem 180b is a monitoring and actuation subsystem that considers the grain loss at the header 120 and associated adjustments to the header (e.g., position and spacing) to facilitate a reduction in loss. The grain loss subsystem 180c is a monitoring and actuation subsystem that considers the grain loss at various portions of the harvester 102 and associated adjustments to facilitate a reduction in loss. As examples, the grain loss subsystem 180c may monitor and/or actuate aspects of the separation process (e.g., at the sieves 148, the cleaning subsystem 142, the thresher 128, and the like) and stages downstream.

The view of FIG. 1 also shows that, in one example, the harvester 102 includes various sensors 190a-190e, including a location sensor 190a; a ground speed sensor 190b; an image sensor 190c; and/or various harvest sensors 190d, 190e (only two of which are depicted as examples), each of which may be coupled to provide information to the controller 116. The location sensor 190a may be considered any one or more location and/or position sensors, such as a GPS receiver, a LORAN system, a dead reckoning system, a cellular triangulation system, inertial measurement units (IMU), or other positioning system, to enable determination the location and/or position of the harvester 102. The ground speed sensor 190b senses the travel speed of the harvester 102 over the ground in any suitable manner, including using aspects of the location sensor 190a. The image sensor 190c may include any suitable type of optical sensors (e.g., cameras), infrared sensors, and radar or LIDAR systems that may be used to capture images of the surrounding environment and selected areas of the harvester 102.

The harvest sensors 190d, 190e generally represent the array of sensors that capture information about the harvesting operation of the harvester 102. Such sensors 190d, 190e may include one or more separator loss sensors, a clean grain camera, and one or more cleaning loss sensors. As examples, a separator loss sensor provides a signal indicative of grain loss in the separators 140; the clean grain camera provides an image of the clean grain in various locations, including the clean grain tank 160; and the clean grain elevator 154 and the cleaning loss sensor provides an indication of the grain lost in the cleaning subsystem 142. Additional sensors 190d, 190e may include the following: a header height sensor that senses a height of header 120; a residue setting sensor that is configured to sense whether the harvester 102 is configured to chop the residue, produce a windrow, etc.; residue performance sensor for the sensing of spread width or distribution or chopping quality or windrow quality; a cleaning shoe fan speed sensor to sense the speed of cleaning fan 144; a concave clearance sensor that senses clearance between the threshing rotor 136 and concaves 138; a threshing rotor speed sensor that senses a rotor speed of rotor 136; a chaffer clearance sensor that senses the size of openings in chaffer 146; a sieve clearance sensor that senses the size of openings in sieve 148; a material other than grain (MOG) moisture sensor that senses a moisture level of the MOG passing through the harvester 102; one or more machine setting sensors configured to sense various configurable settings of the harvester 102; a machine orientation sensor that senses the orientation of the harvester 102; and crop property sensors that sense a variety of different types of crop properties, such as crop type, crop moisture, and other crop properties. Crop property sensors may also be configured to sense characteristics of the severed crop material as the crop material is being processed by the harvester 102. For example, in some instances, the crop property sensors may sense grain quality such as broken grain, MOG levels; grain constituents such as starches and protein; and grain feed rate as the grain travels through the feeder house 124, clean grain elevator 154, or elsewhere in the harvester 102. The crop property sensors may also sense the feed rate of biomass through feeder house 124, through the separator 140 or elsewhere in the harvester 102. The crop property sensors may further sense the feed rate as a mass flow rate of grain through elevator 154 or through other portions of the harvester 102 or provide other output signals indicative of other sensed variables. Crop property sensors may include one or more yield sensors that sense crop yield being harvested by the harvester.

Figure 2:
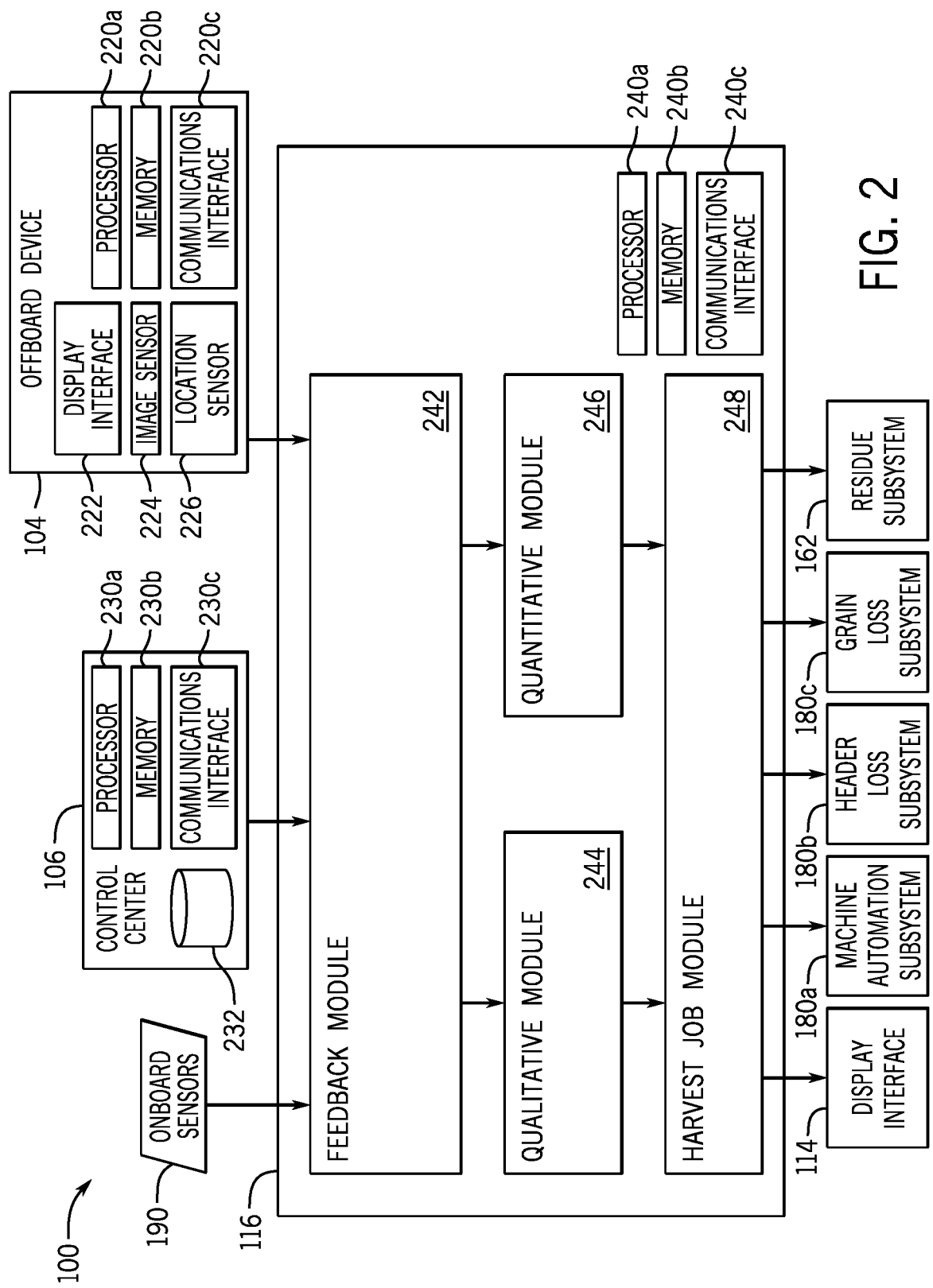
FIG. 2 is a functional schematic representation of some implementation aspects of the agricultural operation evaluation system of FIG. 1 in accordance with an example embodiment.

Reference is made to FIG. 2, which is a more detailed, functional block diagram of the agricultural operation evaluation system 100. The configuration of FIG. 2 is just one example of the agricultural operation evaluation system 100 and example embodiments according to the disclosure herein may be provided in other configurations. As introduced above, the agricultural operation evaluation system 100 includes aspects of the offboard device 104, the control center 106, the harvester onboard sensors 190, the harvester display interface 114, the harvester controller 116, and one or more of the subsystems 162, 180a-180c, as examples.

As introduced above, the offboard device 104 may be embodied as a personal computing device (e.g., personal computer, tablet, smartphone, etc.) and accessories (e.g., aerial vehicles, such as drones, and other mechanisms for positioning sensors that may collect information) associated with the operator or other cooperating user. Generally, the offboard device 104 may include the features typical of such devices, including a processor 230a, memory 230b, and a communications interface 230c that couples various system components including the memory 230b to the processor 230a, as well as components outside of the offboard device 104 (e.g., the harvester 102 and/or the control center 106). As above, the processor 230a may include any suitable processing component to execute instructions stored in memory 230b. As also discussed above, communication interface 230c functions to enable wireless communication, including directly (e.g., via Bluetooth®, radio frequency signals, or the like) or over a network. Thus, the communication interface 230c may include a Bluetooth® transceiver, a radio transceiver, a cellular transceiver, an LTE transceiver, and/or a Wi-Fi transceiver. For example, such communications may utilize one or more of various communication techniques or mechanisms, including radio frequency, Wi-Fi, cellular, telematics, and/or any other suitable platforms.

Among other functions, the processor 220a, memory 220b, and communication interface 220c may support a display interface 222, an image device 224, and a location sensor 226, as well as functional aspects typical of such devices. In one example, the display interface 222 may provide a platform for an operator to interact with system 100 (e.g., in a manner similar to the display interface 114 discussed above). Similarly, the image device 224 is a camera or other type of sensor that may capture images (e.g., in a manner similar to the image sensor 190c discussed above); and the location sensor 226 is a device that may be used to determine the location of the offboard device 104 (e.g., in a manner similar to the location sensor 190a discussed above).

Figure 3:
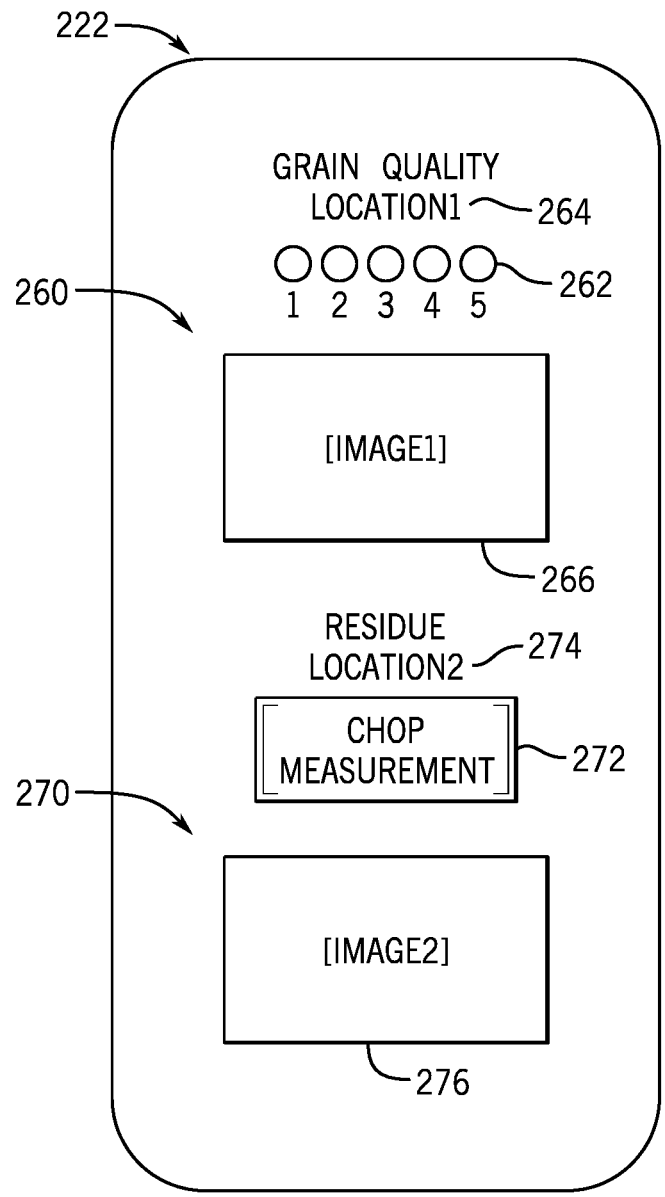
FIG. 3 is a visual representation of a display interface that may be used in the agricultural operation evaluation system of FIG. 1 in accordance with an example embodiment.

In one example, the primary purpose of the offboard device 104 is to receive offboard feedback from the operator and provide the offboard feedback to the controller 116 of the harvester 102, discussed in greater detail below. Reference is briefly made to FIG. 3, which is a visual representation of a display interface 222 for receiving such feedback.

In the display interface 222 of FIG. 3, two feedback areas 260, 270 are provided. For example, in feedback area 260, an operator may provide qualitative feedback regarding grain quality on a scale 262 at a particular location 264 (representatively labeled "location1" in FIG. 3), e.g., by visually and/or manually inspecting the grain. In this example, the operator may also take an image 266 (representatively labeled "image1" in FIG. 3) of the grain in order to provide supporting or independent feedback. In feedback area 270, an operator may provide quantitative feedback regarding residue with a chop measurement 272 at a particular location 274 (representatively labeled "location2" in FIG. 3), e.g., by visually and/or manually inspecting the residue. Also in this example, the operator may take an image 276 (representatively labeled "image2" in FIG. 3) of the residue in order to provide supporting or independent feedback. In some examples, the images 266, 276 may be further processed (e.g., at the device 104, on the harvester 102, at the control center 106, and/or combinations thereof) to provide alternative or additional feedback, particularly qualitative and/or quantitative feedback. Other types of symbology and feedback may be provided. As described below, such feedback is sent to the controller 116 for further consideration.

Returning to FIG. 2, the control center 106 may also provide feedback and/or context information for the agricultural operation evaluation system 100. Generally, the control center 106 may be supported by a processor 230a, memory 230b, and a communications interface 230c similar to those discussed with reference to the offboard device 104. In one example, the control center 106 may provide maps and additional harvest and/or harvester information, which may be stored in database 232. Such maps may include previous harvest details and other historical information, including information from other operators. As noted, the control center 106 may operate as a "backend" system or server that facilities operation within a harvest site or a group of harvest sites. As further noted above, the control center 106 may also interact with unmanned aerial devices in order to provide additional offboard feedback.

In the depicted example, implementation of the agricultural operation evaluation system 100 with the controller 116 may be considered to be organized as one or more functional units or modules 242, 244, 246, 248 (e.g., software, hardware, or combinations thereof). As an example, each of the modules 242, 244, 246, 248 may be implemented with processing architecture such as a processor 240a, memory 240b, and communications interface 240c, as generally discussed above. For example, the controller 116 may implement the modules 242, 244, 246, 248 with the processor 240a based on programs or instructions stored in memory 240b. In the depicted embodiment, the controller 116 of the agricultural operation evaluation system 100 includes a feedback module 242, a qualitative module 244, a quantitative module 246, and a harvest (or other type of agricultural operation) job module 248. The view of FIG. depicts one exemplary organization, and other embodiments may perform similar functions with alternative organization or implementation. Additional details about operation of these modules 242, 244, 246, 248 will be provided below.

As introduced above, the agricultural operation evaluation system 100 may receive data from one or more data sources. As examples, and as discussed in greater detail below, such data sources may include onboard sensors 190, the offboard device 104, and the control center 106, as well as user inputs and/or other systems. Such data may include various forms of feedback and the location associated with the feedback. As also discussed below, the controller 116 uses this data to generate commands and other types of information associated with the harvester 102 and/or the harvester functions in order to render an evaluation of a harvest job and to take steps to improve present and future harvest (or other) operations. The data flows and organization depicted in FIG. 2 are merely examples, and other mechanisms for performing similar functions may be provided, certain functions may be omitted, and additional functions may be added. Aspects of FIG. 1 may be referenced below in the discussion of FIG. 2.

The feedback module 242 is configured to receive the various input parameters from the onboard sensors 190, the control center 106, and/or the offboard device 104. For example, the feedback module 242 may receive feedback (images and other information) from the offboard device 104; the maps and additional background or context information as further feedback from the control center 106; and/or the harvester, harvest, and/or other type of agricultural information as machine data collected by the various sensors 190 on or offboard the harvester 102. In some examples, certain functions of the feedback module 242 discussed below may be performed by the respective data source.

Generally, the feedback module 242 may format the feedback and/or machine data as necessary or desired. As noted, the feedback and machine data from the sources may include location information in the form of GPS coordinates, as examples, which may be used to correlate such data as discussed below.

In some examples, the feedback module 242 may further process the image in order to extract additional feedback and/or one or more input parameters. For example, the feedback module 242 may perform image recognition on the image in order to determine a qualitative parameter associated with the image (e.g., whether or not a number of recognized objects of interest are "good" or "bad") and/or a quantitative parameter associated with the image (e.g., the number of recognized objects of interest). For example, the feedback module 242 may abstract one or more objects from the work environment captured within the image and such object symbology enables recognition and understanding of any relevant information, including grain and/or residue characteristics. In various examples, the image processing may occur on the offboard device 104, at the control center 106, and/or at the harvester 102.

The feedback module 242 provides the feedback from the offboard device 104 and the machine data from the harvester 102, including the associated location data, as well as any additional feedback and/or context information to at least one of the qualitative module 244 and/or and the quantitative module 246. In one example, the feedback module 242 may characterize the type of feedback and/or machine data (e.g., quantitative or qualitative) and provide the feedback and/or machine data to the qualitative module 244 and the quantitative module 246 accordingly. In a further example, the feedback module 242 may generally provide feedback and/ or machine data to the qualitative module 244 and the quantitative module 246 for characterization by each module 244, 246.

As introduced above, the qualitative module 244 receives the feedback and the machine data and extracts or generates one or more qualitative input parameters (or metrics). The qualitative input parameter represents a value that may be further evaluated with other types of input parameters, including other qualitative input parameters and the quantitative input parameters. Depending on the source, the qualitative input parameters may be considered offboard or onboard.

The quantitative module 246 receives the feedback and the machine data and extracts or generates one or more quantitative input parameters (or metrics). The quantitative input parameter represents a value that may be further evaluated with other types of input parameters, including other quantitative input parameters and the qualitative input parameters. Depending on the source, the quantitative input parameters may be considered offboard or onboard.

The harvest job module 248 receives the qualitative input parameters from the qualitative module 244 and the quantitative input parameters from the quantitative module 246. The harvest job module 248 evaluates the qualitative input parameters and the quantitative input parameters in various combinations in order to generate appropriate machine commands in response to the input parameters. Generally, such commands may improve performance for subsequent or continued harvest operations.

As noted above, the feedback and/or machine data received by the feedback module 242 may be associated with a location; and as such, the input parameters generated by the qualitative and quantitative modules 244, 246 may also be associated with respective locations, which are provided to the harvest job module 248. In one example, the harvest job module 248 may correlate, combine, and/or evaluate input parameters according to location in order to generate harvest insights and associated commands.

The harvest job module 248 may evaluate the combination of quantitative input parameters and the qualitative input parameters in any suitable manner, including evaluation of two or more quantitative input parameters, two or more qualitative input parameters, and a combination of one or more quantitative input parameters with one or more qualitative input parameters. The harvest job module 248 may evaluate the input parameters with one or more algorithms and/or models that define relationships between two more parameters. In some examples, the harvest job module 248 may be implemented using a neural network or other type of machine learning model. For example, a machine learning model may be trained with training data entries in order to output connections between the parameters.

As noted, the harvest job module 248 may generate commands based on two or more quantitative input parameters. As a brief example, based on data from the onboard sensors 190, the quantitative module 246 may extract grain loss data collected at a particular location as a quantitative input parameter. Further, based on data collected at the offboard device 104 (e.g., an image and/or an operator manual entry of grain count), the quantitative module 246 may extract grain count data at the particular location as a further quantitative input parameter. The combination of the grain loss data and grain count data at the same location may be considered by the harvest job module 248 in order to increase the confidence in either type of data and/or provide further insights about the grain loss and/or grain count, which in turn may be used to generate commands that calibrate and/or adjust the sensors and/or actuators of grain loss subsystem 180c on the harvester 102. Additional examples of onboard quantitative input parameters that may be considered with particular offboard quantitative input parameters include yield sensor information (i.e., onboard) with scaled carts, elevator feedback, and the like (i.e., offboard); moisture sensor information (i.e., onboard) with scaled carts, elevator feedback, and the like (i.e., offboard); grain quality sensor information (e.g., broken, damaged, MOG content) (i.e., onboard) with scaled carts, elevator feedback, and the like (i.e., offboard); residue distribution from onboard sensors (i.e., onboard) with residue distribution from external sensors or sources (i.e., offboard); and cut quality sensor information (i.e., onboard) with drone or aerial sensor information (i.e., offboard). Moreover, additional systems and subsystems that may benefit from this type of evaluation may include adjustments for the display of various types of information on the display interface 114; adjustments to the machine automation subsystem 180*a*, the header loss subsystem 180*b*, and/or the grain loss subsystem 180*c*; and/or adjustments to the residue subsystem 162, as examples.

As noted, the harvest job module 248 may generate commands based on at least one quantitative input parameter and at least one qualitative input parameter. As a brief example, based on data from the onboard sensors 190, the quantitative module 246 may extract grain loss data collected at a particular location as a quantitative input parameter. Further, based on data collected at the offboard device 104 (e.g., an image and/or an operator evaluation about the nature of grain loss (e.g., good, bad, high, low, or the like)), the qualitative module 244 may extract grain loss data at the particular location as a qualitative input parameter. The combination of the grain loss data from the onboard sensors 190 and grain loss data from the offboard device 104 at the same location may be considered by the harvest job module 248 in order to increase the confidence in either type of data and/or provide further insights about the grain loss and/or grain count, which in turn may be used to generate commands that calibrate and/or adjust the grain loss subsystem 180*c* on the harvester 102. In particular, such information may be used to calibrate the grain loss display preferences onboard the harvester 102 (e.g., on the display interface 114) and/or determine operator threshold and targets for harvest operations. Additional examples of onboard quantitative input parameters that may be considered with particular offboard qualitative input parameters include grain quality sensor information (e.g., broken, damaged, MOG content, etc.) (i.e., onboard) with qualitative operator feedback (i.e., offboard); residue spread sensor information (i.e., onboard) with qualitative operator feedback (i.e., offboard); cut quality sensor information (i.e., onboard) with qualitative operator feedback (i.e., offboard); windrow quality sensor information (i.e., onboard) with qualitative operator feedback (i.e., offboard); header height performance or variation sensor information (i.e., onboard) with qualitative operator feedback (i.e., offboard) (e.g., in order to adjust sensitivities, float pressures, and the like); and feed rate sensor information (i.e., onboard) with qualitative operator feedback (i.e., offboard) (e.g., based on acceleration/deceleration rates).

As a further example on a combination of qualitative and quantitative input parameters, based on data from the onboard sensors 190, the qualitative module 244 may extract residue performance data collected at a particular location as a quantitative input parameter. Such residue performance data may include machine evaluations of chop quality (e.g., under-processed, over-processed, good, bad, or the like) and/or residue spread (e.g., good, bad, poor, acceptable, or the like). Further, based on data collected at the offboard device 104 (e.g., an image and/or an operator evaluation of residue material), the quantitative module 246 may extract residue performance data at the particular location as a quantitative input parameter. Such residue performance data from the offboard device 104 may include sensor data (e.g., from the offboard device 104) about an actual measurement of chop length and/or an actual measurement of residue spread. The combination of different types of residue performance data at the same location may be considered by the harvest job module 248 in order to increase the confidence in either type of data and/or provide further insights about the residue performance, which in turn may be used to generate commands that calibrate and/or adjust the residue subsystem 162 on the harvester 102. In particular, such information may be used to calibrate the residue management display preferences onboard the harvester 102 (e.g., on the display interface 114) and/or determine operator threshold and targets for harvest operations. Similar operations by the harvest operation evaluation system 100 may be performed on grain loss and/or grain quality parameters. Additional examples of onboard qualitative input parameters that may be considered with particular offboard quantitative input parameters include residue chop quality sensor information (i.e., onboard) with physical measurement information (i.e., offboard); residue spread sensor information (i.e., onboard) with drone measurement information (i.e., offboard); and/or grain quality and/or loss sensor information (i.e., onboard) with grain quality and/or loss sensor information (i.e., offboard). Moreover, additional systems and subsystems that may benefit from this type of evaluation may include adjustments in the form of modification in the display of various types of information on the display interface 114; adjustments to the machine automation subsystem 180*a*, the header loss subsystem 180*b*, and/or the grain loss subsystem 180*c*; and/or adjustments to the residue subsystem 162, as examples.

As noted, the harvest job module 248 may generate commands based on two or more qualitative input parameters. As a brief example, based on data from the onboard sensors 190, the qualitative module 244 may extract residue performance quality (e.g., chop quality, such as under-processed, over-processed, good, bad, or the like; and/or residue spread, such as good, bad, poor, acceptable, or the like) collected at a particular location as a qualitative input parameter. Further, based on data collected at the offboard device 104 (e.g., an image evaluation and/or an operator manual entry of similar quality characteristics regarding chop quality and/or residue spread), the qualitative module 244 may extract residue performance data at the particular location as a further qualitative input parameter. The combination of this data at the same location may be considered by the harvest job module 248 in order to increase the confidence in either type of data and/or provide further insights about the performance of the residue subsystem 162, which in turn may be used to generate commands that calibrate and/or adjust the residue subsystem 162 on the harvester 102. Such information may be used to calibrate residue display preferences onboard the harvester 102 (e.g., on the display interface 114) and/or determine operator threshold and targets for harvest operations. Such metric combinations may also be used to evaluate grain quality, as a further example. Additional examples of onboard qualitative input parameters that may be considered with offboard qualitative input parameters include residue spread sensor information (i.e., onboard) with drone or operator qualitative feedback (i.e., offboard); grain quality and/or loss sensor information (i.e., onboard) with drone or operator qualitative feedback regarding grain quality and/or loss (i.e., offboard); and/or grain loss sensor information (i.e., onboard) with drone or operator qualitative feedback regarding grain loss information (i.e., offboard).

Moreover, the harvest job module 248 may consider more than one type of quantitative input parameters with one or more types of qualitative input parameters (and vice versa). As a further example, based on data from the onboard sensors 190, the quantitative module 246 may extract grain loss data collected at a particular location as a quantitative input parameter. Further, based on data collected at the offboard device 104 (e.g., an image and/or an operator manual entry of grain count), the quantitative module 246 may extract grain count data at the particular location as a further quantitative input parameter. Based on data collected at the offboard device 104 (e.g., an image and/or an operator evaluation of grain loss), the qualitative module 244 may extract grain loss data at the particular location as a qualitative input parameter. In effect, this combination of two quantitative input parameters and one qualitative input parameter may be used to generate commands to more appropriately calibrate the grain loss subsystem 180c, to adjust grain loss system display preferences of the display interface 114 on the harvester 102, and to determine harvest thresholds and targets. Generally, any combination of two or more offboard quantitative feedback, offboard qualitative feedback, onboard quantitative feedback, and onboard qualitative feedback may be collected, considered, and acted upon by the harvest operation evaluation system 100.

In effect, the harvest job module 248 may generate commands for a number of systems and/or components of harvester 102, including, as depicted, the display interface 114, the machine automation subsystem 180a, the header loss subsystem 180b, the grain loss subsystem 180c, and/or the residue subsystems 162. In some examples, the harvest job module 248 may additionally provide commands and/or other inputs to the control center 106 and/or the offboard device 104. For example, the harvest job module 248 may provide updates to the maps stored in database 232; and/or the harvest job module 248 may provide display commands to the display interface 222.

Figure 4:
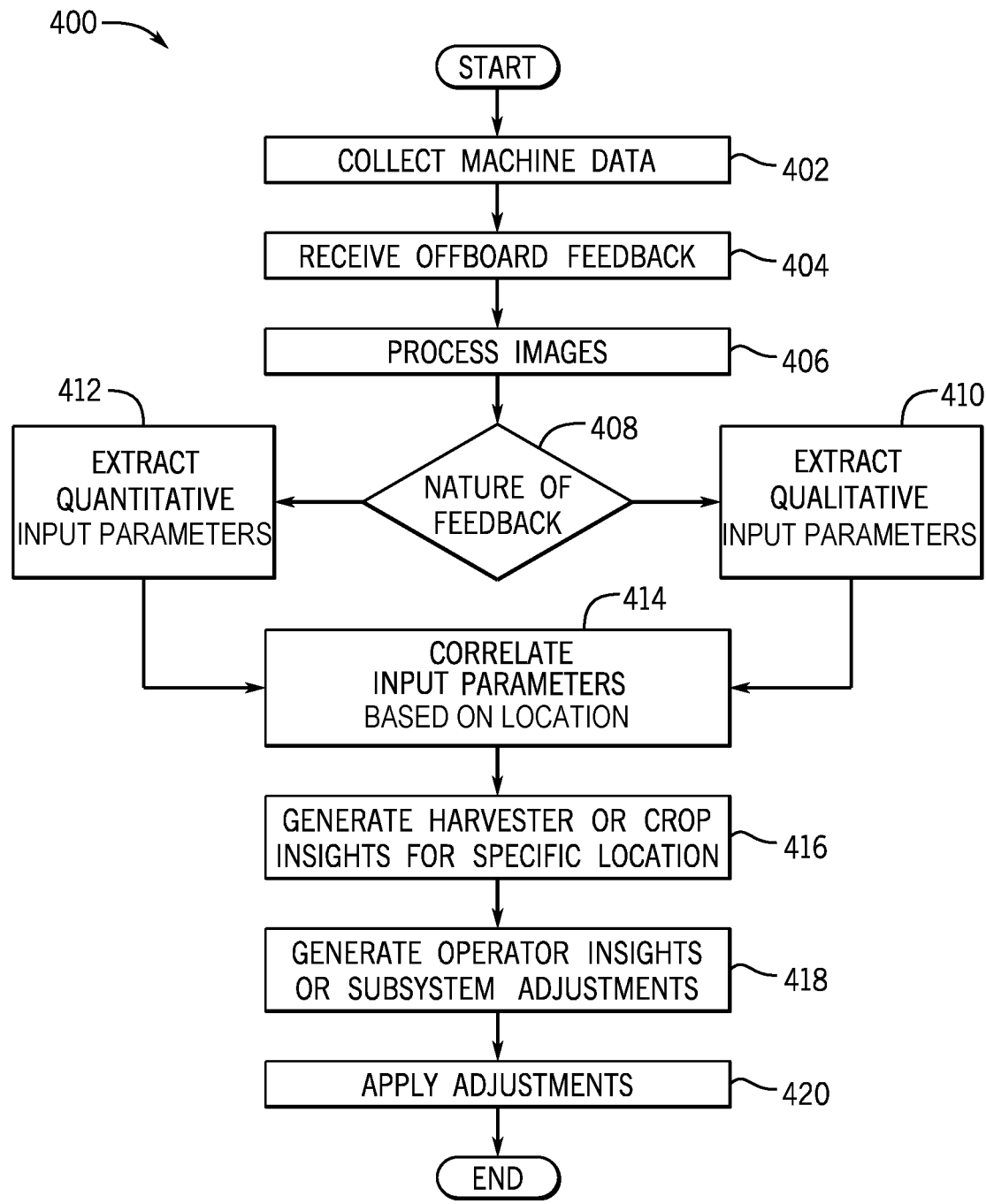
FIG. 4 is a flow chart of one implementation of an agricultural operation evaluation method in accordance with an example embodiment.

Referring now also to FIG. 4, as well with continuing reference to FIGS. 1-3, a flowchart illustrates a method 400 that may be performed by the agricultural operation evaluation system 100 in accordance with the present disclosure. As can be appreciated in light of the disclosure, the order of operation within the method 400 is not limited to the sequential execution as illustrated in FIG. 4, but may be performed in one or more varying orders as applicable and in accordance with the present disclosure. Further one or more steps may be omitted and/or additional steps added.

In a first step 402, the agricultural operation evaluation system 100 may collect machine data as input parameters, e.g., from one or more onboard sensors 190. In some examples, the agricultural operation evaluation system 100 may further receive data as input parameters from the control center 106, e.g., in the forms of maps and/or other context data. As introduced above, such input parameters may be qualitative input parameters and/or quantitative input parameters.

In a further step 404, the agricultural operation evaluation system 100 may receive offboard feedback, e.g., from one or more offboard devices 104. Such feedback may include images.

In step 406, the agricultural operation evaluation system 100 may process any images in order to extract any additional feedback or input parameters. In some examples, the agricultural operation evaluation system 100 may correlate the input parameters from the images with associated input parameters from the offboard feedback. As introduced above and discussed below, such images may be processed in order to extract qualitative input parameters and/or quantitative input parameters.

In step 408, the agricultural operation evaluation system 100 evaluates the offboard feedback and machine data and characterizes and/or determines the nature as qualitative or quantitative. Qualitative input parameters are considered with respect to step 410 in which the agricultural operation evaluation system 100 extracts input parameters from the qualitative feedback as either onboard or offboard qualitative input parameters (depending on the source); and quantitative input parameters are considered with respect to step 412 in which the agricultural operation evaluation system 100 extracts input parameters from the quantitative feedback as either onboard or offboard quantitative input parameters (depending on the source).

In step 414, the agricultural operation evaluation system 100 considers the input parameters; and in one example, correlates the harvester or machine input parameters with the feedback input parameters based on location (e.g., GPS).

In step 416, the agricultural operation evaluation system 100 generates harvester or crop insights based on the correlated feedback and harvester input parameters; and in step 418, the agricultural operation evaluation system 100 generates insights for the display to the operator and/or harvester subsystem adjustments based on the harvester or crop insights from 416.

In step 420, the agricultural operation evaluation system 100 applies the adjustments to the harvester subsystems and/or to the harvester display interface 114 for consideration by the operator of the operator insights.

Accordingly, the systems and methods discussed above provide a mechanism for incorporating qualitative and quantitative operator feedback with machine data in order to determine and implement machine and harvest insights.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An agricultural operation evaluation system for an agricultural work vehicle having one or more onboard actuators, comprising:
    an offboard device configured to collect offboard feedback associated with the agricultural operation and location information for the offboard feedback; and
    a controller having a processor and memory architecture configured to:
        receive the offboard feedback and the location information for the offboard feedback from the offboard device;
        determine at least one offboard input parameter from the offboard feedback;
        receive machine data including at least one onboard input parameter and location information for the at least one onboard input parameter;
        correlate the at least one offboard input parameter and the at least one onboard input parameter based on the location information for the at least one offboard input parameter and the location information for the at least one onboard input parameter;
        determine one or more agricultural work vehicle adjustments based on the correlated at least one offboard input parameter and at least one onboard input parameter; and
        implement the one or more agricultural work vehicle adjustments based on the correlated at least one offboard input parameter and at least one onboard input parameter as control commands to the one or more onboard actuators.

2. The agricultural operation evaluation system of claim 1, wherein the at least one offboard input parameter is an offboard qualitative input parameter.

3. The agricultural operation evaluation system of claim 1, wherein the at least one offboard input parameter is an offboard quantitative input parameter.

4. The agricultural operation evaluation system of claim 1, wherein the at least one onboard input parameter is an onboard qualitative input parameter.

5. The agricultural operation evaluation system of claim 1, wherein the at least one onboard input parameter is an onboard quantitative input parameter.

6. The agricultural operation evaluation system of claim 1, wherein the at least one offboard input parameter is an offboard qualitative input parameter and the at least one onboard input parameter is an onboard qualitative input parameter.

7. The agricultural operation evaluation system of claim 1, wherein the at least one offboard input parameter is an offboard quantitative input parameter and the at least one onboard input parameter is an onboard qualitative input parameter.

8. The agricultural operation evaluation system of claim 1, wherein the at least one offboard input parameter is an offboard qualitative input parameter and the at least one onboard input parameter is an onboard quantitative input parameter.

9. The agricultural operation evaluation system of claim 1, wherein the at least one offboard input parameter is an offboard quantitative input parameter and the at least one onboard input parameter is an onboard quantitative input parameter.

10. The agricultural operation evaluation system of claim 1, wherein the offboard device is configured to collect the offboard feedback as an image and the controller is configured to extract the at least one offboard input parameter from the image.

11. The agricultural operation of claim 10, wherein the controller is configured to extract the at least one offboard input parameter from the image as an offboard quantitative input parameter.

12. The agricultural operation of claim 10, wherein the controller is configured to extract the at least one offboard input parameter from the image as an offboard qualitative input parameter.

13. The method of claim 1, wherein the collecting the offboard feedback includes collecting the offboard feedback as an image, and the step of determining the at least one offboard input parameter from the offboard feedback includes extracting the at least one offboard input parameter from the image.

14. A method for evaluating an agricultural operation of an agricultural work vehicle having one or more onboard actuators, the method comprising: collecting, with an offboard device, offboard feedback associated with the agricultural operation and location information for the offboard feedback; receiving, with a controller, the offboard feedback and the location information for the offboard feedback from the offboard device; determining, with the controller, at least one offboard input parameter from the offboard feedback; receiving, with the controller, machine data including at least one onboard input parameter and location information for the least one onboard input parameter; correlating, with the controller, the at least one offboard input parameter and the at least one onboard input parameter based on the location information for the at least one offboard input parameter and the location information for the at least one onboard input parameter; and determining, with the controller, one or more agricultural work vehicle adjustments based on the correlated at least one offboard input parameter and at least one onboard input parameter, and implementing, with the controller, the one or more agricultural work vehicle adjustments based on the correlated at least one offboard input parameter and at least one onboard input parameter as control commands to the one or more onboard actuators.

15. The method of claim 14, wherein the at least one offboard input parameter is an offboard qualitative input parameter.

16. The method of claim 14, wherein the at least one offboard input parameter is an offboard quantitative input parameter.

17. The method of claim 14, wherein the at least one offboard input parameter is an offboard qualitative input parameter and the at least one onboard input parameter is an onboard qualitative input parameter.

18. The method of claim 14, wherein the at least one offboard input parameter is an offboard quantitative input parameter and the at least one onboard input parameter is an onboard qualitative input parameter.

19. The method of claim 14, wherein the at least one offboard input parameter is an offboard qualitative input parameter and the at least one onboard input parameter is an onboard quantitative input parameter.

20. The method of claim 14, wherein the at least one offboard input parameter is an offboard quantitative input parameter and the at least one onboard input parameter is an onboard quantitative input parameter.

* * * * *